Jan. 26, 1926.

W. H. EBERT ET AL 1,571,110

MUSIC INDICATOR

Filed Feb. 17, 1923

Inventors
W. H. Ebert.
A. G. Ebert.

By
Lacey & Lacey, Attorneys.

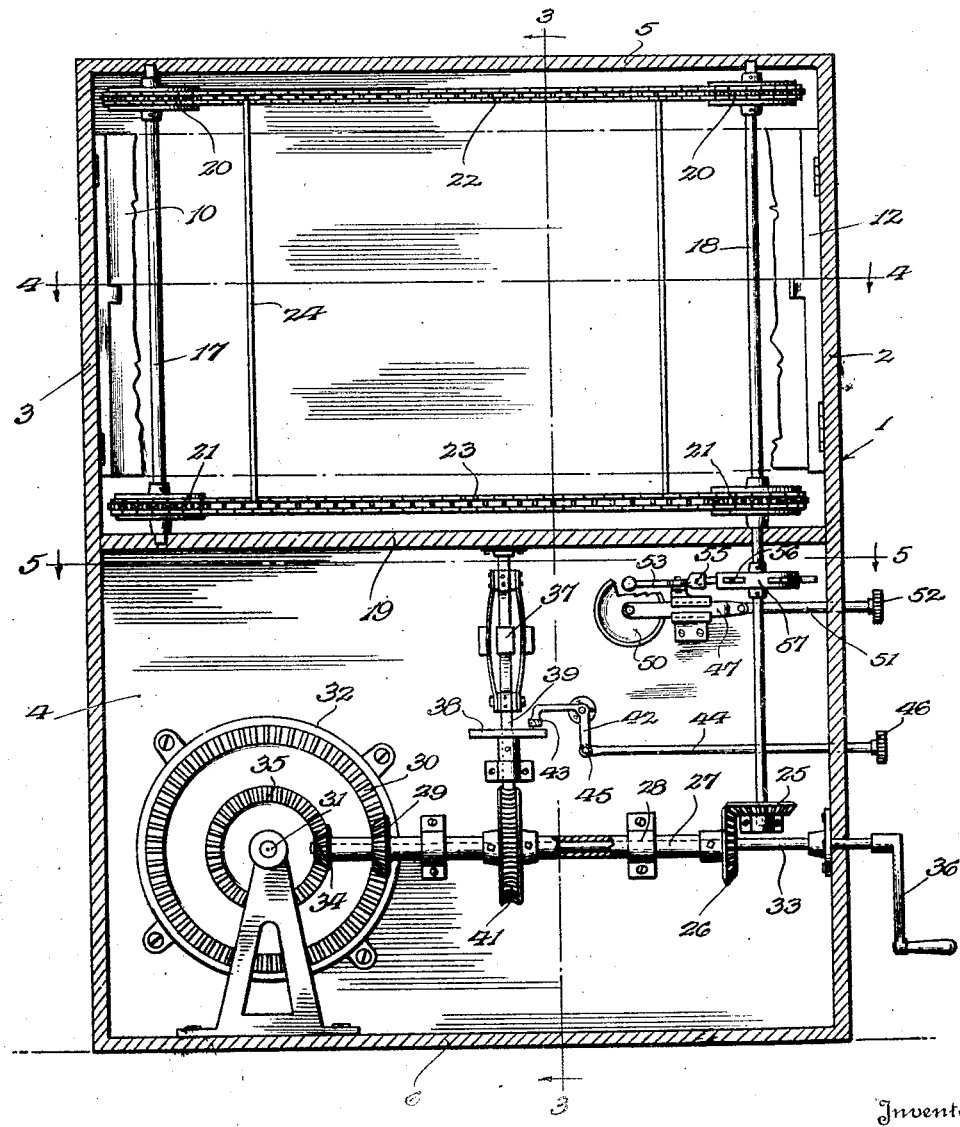

Jan. 26, 1926.
W. H. EBERT ET AL
MUSIC INDICATOR
Filed Feb. 17, 1923
1,571,110
3 Sheets-Sheet 3
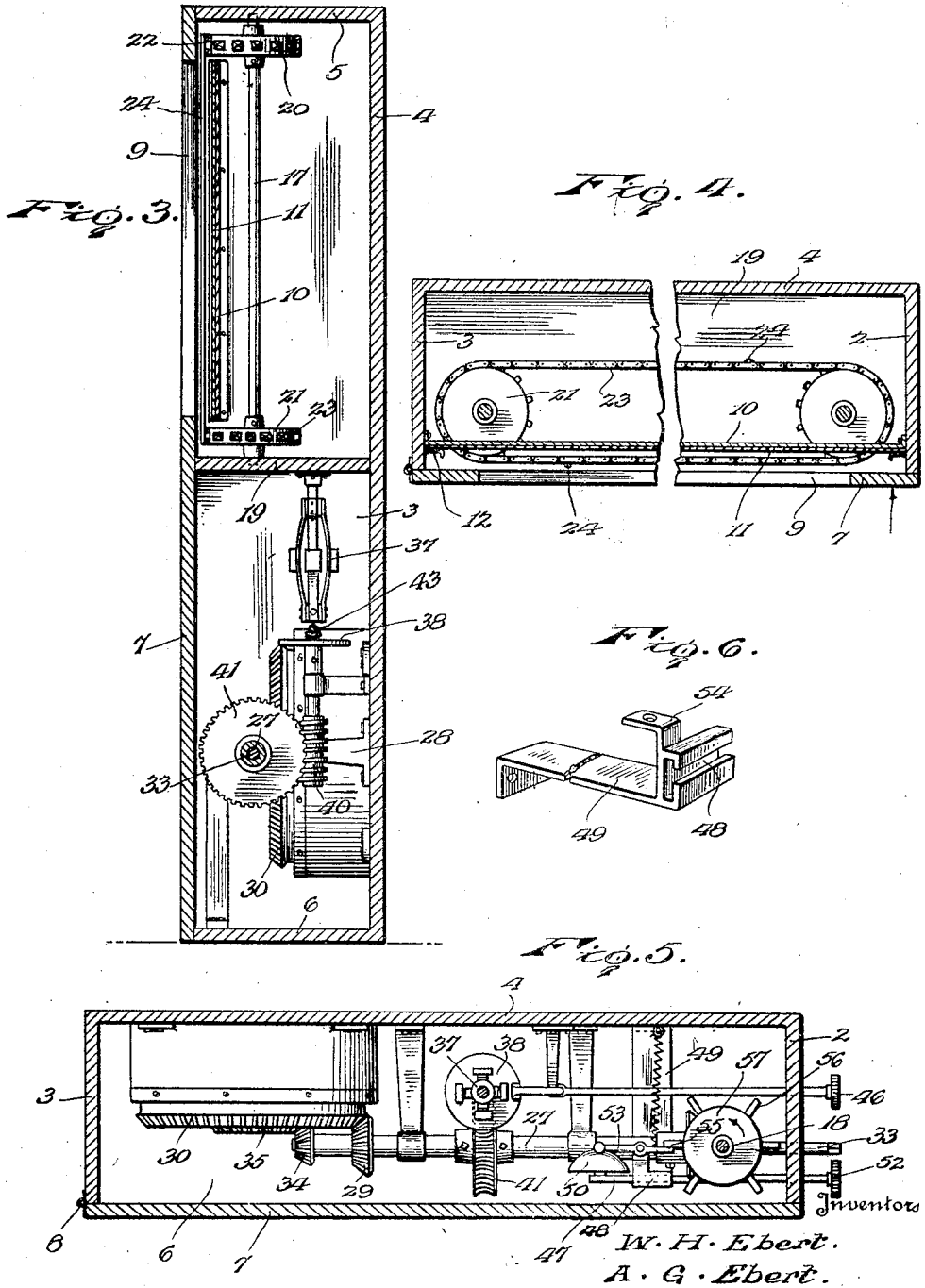
Inventors
W. H. Ebert.
A. G. Ebert.
By Lacey & Lacey, Attorneys Patented Jan. 26, 1926.

1,571,110

UNITED STATES PATENT OFFICE.

WILLIAM H. EBERT AND ALBERT G. EBERT, OF BUFFALO, NEW YORK.

MUSIC INDICATOR.

Application filed February 17, 1923. Serial No. 619,708.

*To all whom it may concern:*

Be it known that WILLIAM H. EBERT and ALBERT G. EBERT, citizens of the United States, residing at Buffalo, in the county of Erie and State of New York, have invented certain new and useful Improvements in Music Indicators, of which the following is a specification.

This invention relates to indicators and more particularly to an indicating apparatus by the use of which one may readily and accurately read music and translate the same either vocally or instrumentally with the certainty that each individual note will be held for the proper length of time.

One of the primary objects of the invention is to provide an indicator embodying means for supporting a music sheet onto which the music to be translated is copied and arranged with its notes spaced in accordance with their relative values, and means automatically movable over the face of said sheet at a predetermined rate of speed for registration successively with the notes to determine when and for what period of time they are to be sounded and held.

Another object of the invention is to provide audible means for indicating the beats in a measure, in accordance with the time to which the music is set.

In the accompanying drawings:

Figure 2 is a vertical transverse sectional view through the apparatus taken in a plane immediately in rear of the front of the casing thereof;

Figure 3 is a vertical front to rear sectional view on the line 3—3 of Figure 2 looking in the direction indicated by the arrows;

Figure 4 is a horizontal sectional view on the line 4—4 of Figure 2;

Figure 5 is a similar view on the line 5—5 of Figure 2;

Figure 6 is a perspective view of the supporting guide for the bell support.

Figure 1:
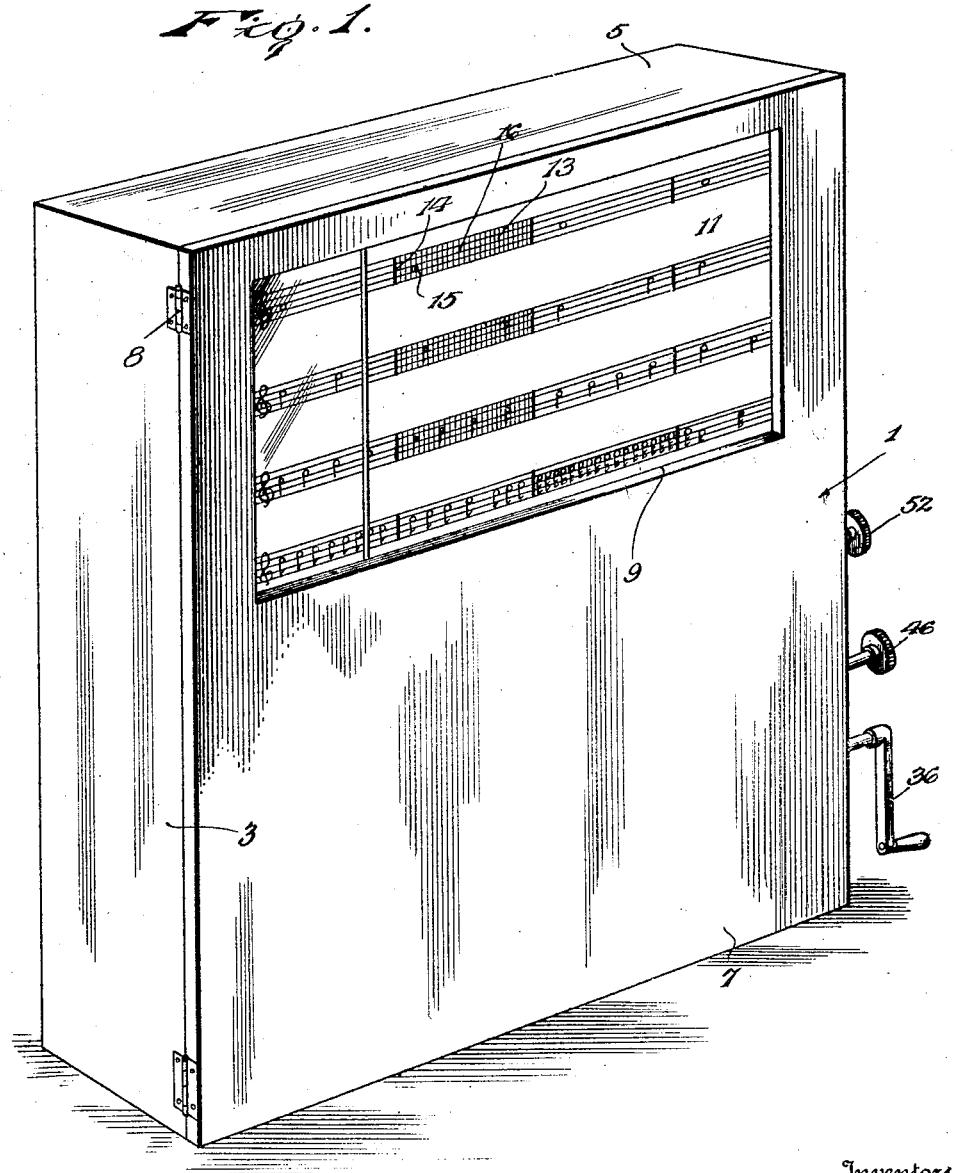
Figure 1 is a perspective view of the indicating apparatus embodying the invention.

The indicating mechanism is mounted within a casing which is indicated in general by the numeral 1 and which comprises sides 2 and 3, a back 4, a top 5, a bottom 6, and a front 7 which latter is hinged at one side, as indicated by the numeral 8, the said front 7 being provided near its top with a rectangular sight opening 9 through which the music sheet and indicator traveling across the same may be viewed.

Within the casing and immediately in rear of the sight opening 9 there is supported a back plate 10 against which the music sheet, indicated by the numeral 11, is to be disposed, the sheet being held in place at its end margins by any suitable means as, for example, clips 12 mounted upon the face of the said plate 10. The music sheet 11 is not an ordinary music sheet but one especially designed for employment in connection with the indicating apparatus of the invention. The sheet is ruled with staff lines 13. The staff is divided at intervals by lines 14 defining the measures, and the notes, indicated by the numeral 15, are written on the staff within the defined measures thereof, the notes being copied from the published music sheet which is to be translated or played. The music sheet 11 is also ruled with vertical lines indicated by the numeral 16 which divide the staff preferably at intervals of one-eighth inch. In carrying out the invention, where a whole note is to be written and constitutes the first note of the piece of music, it is placed in the first measure of the uppermost staff upon the first one of the lines 16 to the left in said staff.

The end of the measure is then indicated by one of the measure lines 14 which is placed two inches or sixteen of the lines 16 distant from the said note. If, for example, the two following notes are half notes they will be spaced an inch apart and both contained in a measure defined by a measure line 14 spaced two inches from the first mentioned measure line, this arrangement being modified along similar lines in the instances of notes of other value and in accordance with the time to which the music is set The means provided for successively indicating the notes to be played embodies shafts 17 and 18 which are mounted within the casing 1, being journaled at their upper ends in the top 5 of the casing and at their lower portions in a horizontally disposed partition wall 19 which divides the casing interiorly, as shown in Figures 2 and 3 of the drawings. Upper and lower sprocket gears 20 and 21 are fixed upon the shafts 17 and 18, and chains 22 and 23 are trained about the said gears 20 and 21 respectively. Pointer rods 24 are fixed at their ends to the chains and extend vertically between the same and any number of these rods may be provided For example, two of the rods may be provided equi-distantly spaced throughout the length of the chains and so arranged that, in the rotation of the shafts 17 and 18, the rods will be successively carried with a steady motion across the face of the music sheet, the spacing of the rods being such that as one of the rods is leaving the right hand end of the sheet, the other rod will be passing onto the face of the sheet at the left hand end thereof. Thus, in the operation of the indicator means, the staffs may be successively read without any necessity of resetting or adjusting the indicator means. As the shafts 17 and 18 are rotated at a predetermined rate of speed, the rods 24 will be moved across the face of the music sheet at a predetermined rate of speed and as the active rod registers with each successive note in the staff being played, the note will be sounded or translated and will be held until the rod registers with the next note in line. Therefore, the speed of movement of the indicator rod being constant, each note translated will be held for precisely the proper period of time, and the user of the apparatus is enabled to accurately translate the music.

In order that motion may be imparted to the indicator means, the shaft 18 is extended downwardly below the partition 19 and is provided at its lower end with a bevel gear 25 which meshes with a gear 26 upon one end of a sleeve shaft 27. The shaft 27 is mounted in bearings 28 in the casing and carries a bevel gear 29 which meshes with a gear 30 upon the shaft 31 of a spring motor 32. A shaft 33 is rotatably mounted through the shaft 27 and at one end is provided with a bevel pinion 34 meshing with a gear 35 upon the motor shaft 31, the other end of the shaft 33 being extended through the side wall 2 of the casing and provided with an operating crank handle 36 whereby it may be manually rotated for the purpose of winding the motor 32

In order that the speed of rotation of the shaft 27 may be controlled so as to be uniform, a governor is provided in connection with said shaft and comprises the usual centrifugal device 37 and brake disc 38 which are mounted upon the usual shaft 39 having a worm 40 which meshes with a worm gear 41 upon the said shaft 27. An angle lever 42 is mounted within the casing and one arm of this lever is provided with a friction shoe 43 having coaction with the friction face of the disc 38. An adjusting rod 44 is pivotally connected, as as 45, to the other arm of the lever 42 and extends through the wall 2 of the casing and is provided with a finger knob 46, it being understood that longitudinal adjustment of the rod 44 will serve to adjust the friction shoe 43 with relation to the friction face of the disc 38 This affords not only means whereby the speed of operation may be suitably varied but also as a means for stopping the operation of the mechanism when so desired.

It is desirable to give audible indication of the beats of each measure in accordance with the time to which the music is set, and for this purpose a supporting bar 47 is slidably mounted in a guide 48 provided at the end of a bracket arm 49 mounted within the casing preferably upon the back wall thereof, and a bell 50 is supported at one end of the said bar. An operating rod 51 is connected to the other end of the bar and extends through the wall 2 of the casing and is provided with a finger knob 52 whereby it may be adjusted for the purpose of laterally adjusting the bell 50. A clapper 53 is mounted upon an extension 54 of the bracket arm 49 and coacts with the bell when the bell is in position for such coaction. The clapper is provided at one side of its pivot with an abutment lip 55 against which tappet fingers 56 upon a wheel 57 are adapted to successively ride, the wheel 57 being fixed upon the shaft 18.

From the foregoing description of the invention, it will be understood that the motor is first wound by rotating the crank handle 36 after which the music sheet is placed in position, and the rod 44 adjusted so as to provide for travel of the indicator rods 24 across the face of the music sheet at the proper rate of speed. The user of the apparatus will then translate the notes as they are successively indicated by the said rods 24, holding each note until the succeeding note is indicated. In the meantime the fingers 56 sweeping past the lip of the bell clapper 53 will actuate the clapper to sound the bell at intervals corresponding to the beats in each successive measure of the staff.

Having thus described the invention, what is claimed as new is:

1. In indicating mechanism, in combination, a music sheet having a staff thereon divided by lines defining measures and other lines defining divisions of the measures, the notes of the music being arranged within the measures and with relation to the division lines in accordance with the respective values of the notes, an indicator element, means for moving the said element across the sheet at a constant predetermined rate of speed, and audible means for indicating the beats of a measure.

2. In indicating mechanism, in combination, a music sheet having a staff thereon divided by lines defining measures and having notes arranged in the measures in accordance with the values of the notes, an indicator element, means for moving said element across the music sheet at a constant rate of speed, said means including chains to which the indicator element is secured and upright shafts geared to said chains, a bracket adjacent one of said shafts, a bell clapper mounted on said bracket, tappets disposed on the shaft and arranged to actuate the clapper, a bell to be sounded by the clapper, and a bar carrying the bell and slidably mounted on said bracket whereby to carry the bell beyond the range of the clapper.

In testimony whereof we affix our signatures.

WILLIAM H. EBERT. [L. S.]
ALBERT G. EBERT. [L. S.]